United States Patent

Frederick et al.

[15] 3,690,002
[45] Sept. 12, 1972

[54] METHOD AND APPARATUS FOR WASHING CHEESE CURD

[72] Inventors: Charles D. Frederick, Western Springs, Ill.; Kenneth D. Dembny, Fort Atkinson, Wis.; Meredith C. Thomson, Oconomowoc, Wis.

[73] Assignee: Said Swift and Company by said Frederick

[22] Filed: March 30, 1970

[21] Appl. No.: 23,828

[52] U.S. Cl. .................31/89, 31/46, 99/115, 99/243
[51] Int. Cl. .................A01j 25/11, A23c 19/00
[58] Field of Search ........99/115, 116; 31/46, 47, 89; 165/109

[56] References Cited

UNITED STATES PATENTS

| 964,935 | 7/1910 | Poulin et al.................165/109 |
| 3,580,161 | 5/1971 | Pontecorvo et al..........99/243 |
| 3,523,367 | 8/1970 | Czulak..........................31/89 |

OTHER PUBLICATIONS

Kosikomski, F., Cheese and Fermented Milk Foods., Published by the Author, Department of Food Science, Cornell University, Ithica, N.Y., 1966 (p. 215) SF271.K6.

*Primary Examiner*—A. Louis Monacell
*Assistant Examiner*—D. M. Naff
*Attorney*—Edward T. McCabe and Charles E. Bouton This application filed under rule 47a.

[57] ABSTRACT

Cheese curd is washed under controlled conditions to produce a desired moisture level therein by continuously feeding milled curd, and water at a selected temperature between 60°–85° F., into a rotating annular vessel wherein the curd and water are agitated while being carried on a circular course. The curd and a portion of water are continuously discharged prior to being carried a full rotation of the vessel; and the rate of rotation of the vessel is adjustable to limit the time that the curd is carried therein.

21 Claims, 5 Drawing Figures

INVENTORS
CHARLES D. FREDERICK
KENNETH D. DEMBNY
MEREDITH C. THOMSON

BY  E T McCabe, Atty

INVENTORS
CHARLES D. FREDERICK
KENNETH D. DEMBNY
MEREDITH C. THOMSON

INVENTORS
CHARLES D. FREDERICK
KENNETH D. DEMBNY
MEREDITH G. THOMSON

BY

METHOD AND APPARATUS FOR WASHING CHEESE CURD

This invention relates to the cheese-making art; and more particularly pertains to an improved method and apparatus for soaking or washing curd in certain cheese-making operations such as in the manufacture of some types of natural cheese.

In cheese manufacturing, natural cheeses are made by coagulating or curdling milk, stirring and heating the curd, draining off the whey and collecting or pressing the curd. Certain cheeses benefit from a step of washing or soaking the curd after it has been separated from the whey and before it is pressed. For example, a washed-curd (or soaked-curd) cheese having a semi-soft or slightly firm texture is made in the same way as the usual hard cheddar cheese except that the milled curd is washed with water before it is salted. Some other cheeses using washed curd are Colby, Monterey and Jack cheeses.

Thus in the processing of cheese, such as washed-curd, the milk (which may be pasteurized) is normally fed into a cheese vat where starter is added and the milk is agitated while ripening to develop acidity. When the proper ripening has been completed, rennet and color are mixed in thoroughly and the stirring is stopped. The acid condition develops curd, and when the latter is sufficiently firm it is cut into cubes and then heated. Thereafter the whey is drained off and the curd allowed to set and become firm. Then it is cheddared or matted, that is, it is cut into slabs which are turned frequently, and, finally, when sufficiently firm, piled in layers. This curd is then run through a curd mill whereafter it may be washed or soaked.

The washing or soaking is continued for a sufficient period to achieve a desired moisture content that directly affects the final moisture content of the finished cheese. Close control of the amount of moisture picked up is important to preserve the identity of the cheese and to conform with applicable government regulations. Washing also reduces the lactose content and final acidity as well as decreases body firmness and increases the openness of the texture of the cheese.

To complete the process, the washed curd is drained and then salted and pressed, whereupon it is stored for curing.

In the past washing or soaking has been accomplished in batches by depositing a given quantity of curd in a large vat and holding it there, sometimes under agitation, for from several minutes up to possibly a half hour whereafter the water is drained away. Such batch processing is cumbersome in that it requires a relatively large amount of equipment for the quantity of curd that can be processed; and the geometry of the equipment is not conducive to uniform exposure of all of the pieces of cheese curd. Close control of the amount of moisture picked up by the curd during batch soaking is difficult due to the volume that must be manipulated. Additionally, batch processing requires greater attention of an operator and is not susceptible to automatic control.

It must also be understood that cheese making, while a highly developed art, is not a precise process. The industry relies, in large measure, upon the skill of operators obtained through long experience to produce cheeses of reasonably consistent characteristics and quality throughout the year. Many variables influence cheese making and necessitate changes dependent upon the operator's judgment. For example, the nature (quality and composition) of milk received for cheese making varies from time to time, especially with the seasons, and is known to depend, in part, upon the specific type of production animal and the feed of the animal; and nature of the milk has direct impact upon cheese-making conditions including the rate at which the resultant curd will pick up moisture.

Accordingly, it is a principal object of the present invention to provide an improved method and apparatus for washing cheese curd in a continuous operation.

It is another object of the present invention to provide an improved method and apparatus for washing cheese curd in a manner to uniformly expose each piece of curd to uniform conditions.

It is yet another object of the present invention to provide an improved method and apparatus for reducing the time and manpower requirements in the washing of cheese curd.

It is still another object of the present invention to provide an improved method and apparatus for the washing of cheese curd wherein the conditions of time duration and water temperature may be closely controlled to regulate the amount of moisture picked up by the curd.

Basically, the present invention contemplates the steps of maintaining a body of curd and water within an annular zone that is rotated about its imaginary axis or center to carry the water and curd along a circular course. Into the zone milled cheese curd pieces are continuously fed along with sufficient water make-up to maintain a desired level within the zone. While the water and curd and the entire zone are being rotated, the water and curd are subjected to agitation at fixed positions along the circular course. As the water and curd near completion of one full rotation, the curd and a portion of the water are discharged from the rotating zone, preferably assisted by lifting the curd from the bottom of the zone as it approaches the point of discharge. Preferably, the curd is immediately separated from that portion of the water discharged with it; and the separated and the washed curd is then passed to further processing operations such as salting and hooping and the like.

A preferred apparatus devised for carrying out the foregoing method comprises an annular vessel mounted upon a means to rotate same in a horizontal plane. Water supply means is located within the vessel to detect and maintain a desired level of water therein; and a feeding means is positioned at a fixed location above the vessel to deposit milled curd pieces therein. The annular vessel is continuously rotated about its center axis and hence keeps the body of water moving in a circular course or path. At fixed positions above the vessel are located a plurality of agitating means that extend downwardly into the body of water maintained within the vessel. In operation the vessel carries the water and curd past the succession of agitating means. At a point beyond the agitating means and just short of the feeding means is located a discharging means that extends to the bottom of the vessel and functions to remove curd and a portion of the water therefrom.

Preferably the discharging means deposits the curd and water on a separating means that divides the curd from the water from whence the former is passed to further equipment for salting and hooping the curd.

Further objects and advantages of the present invention will become apparent upon reading the following description in conjunction with the drawings wherein.

Figure 1:
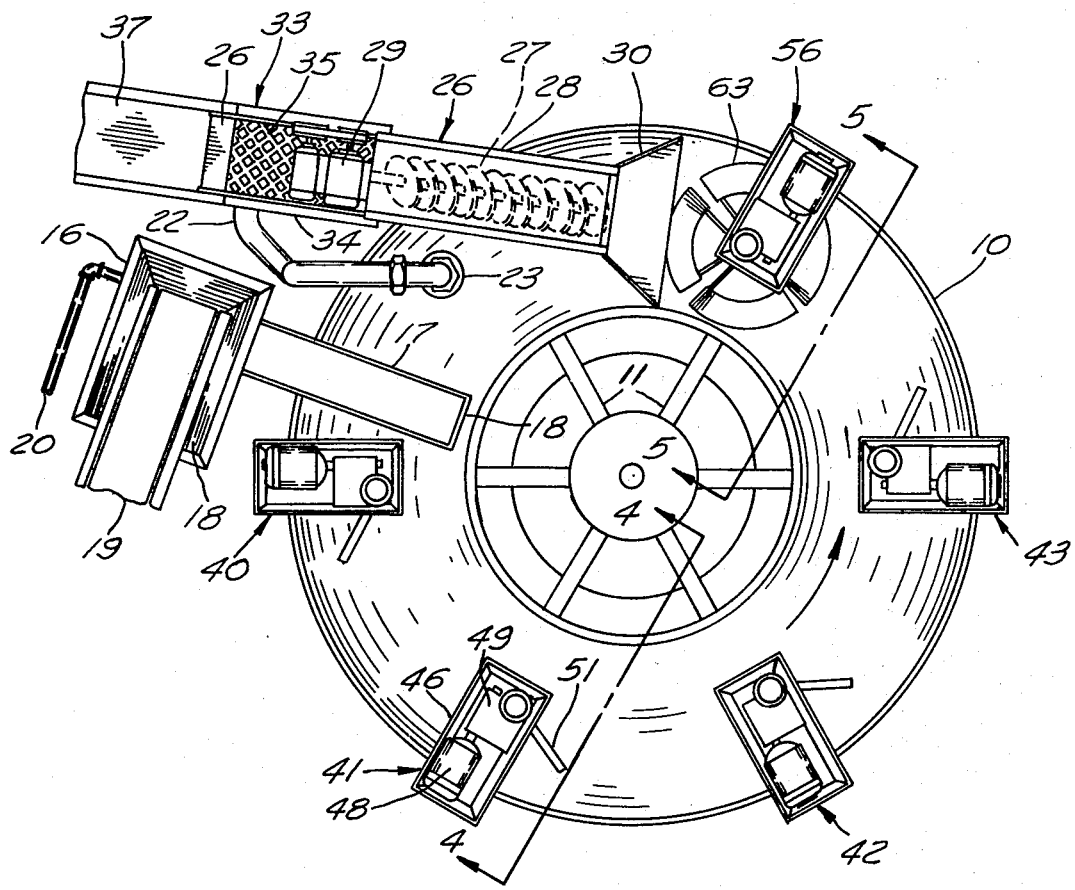
FIG. 1 is a plan view of a preferred embodiment of the apparatus of the present invention.
Figure 2:
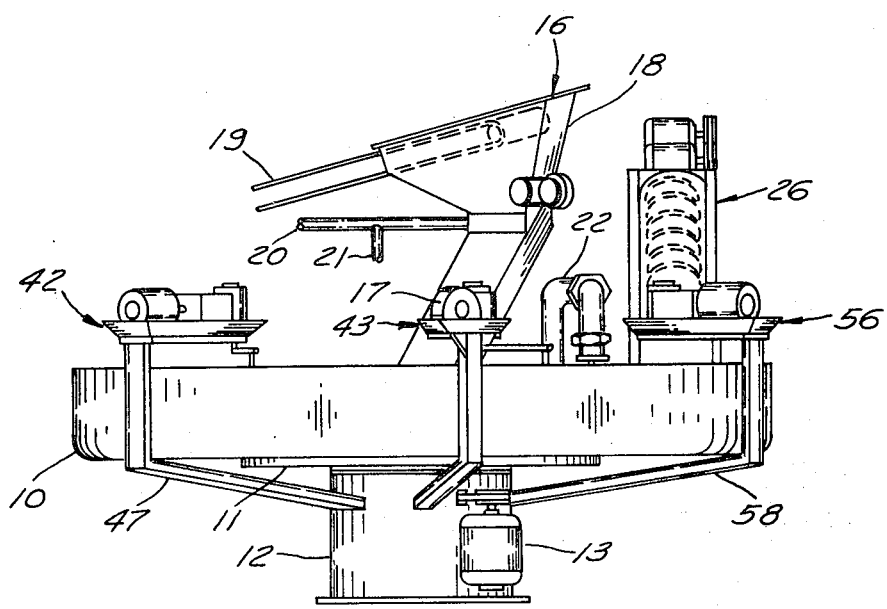
FIG. 2 is a side elevation of the apparatus shown in FIG. 1.
Figure 3:
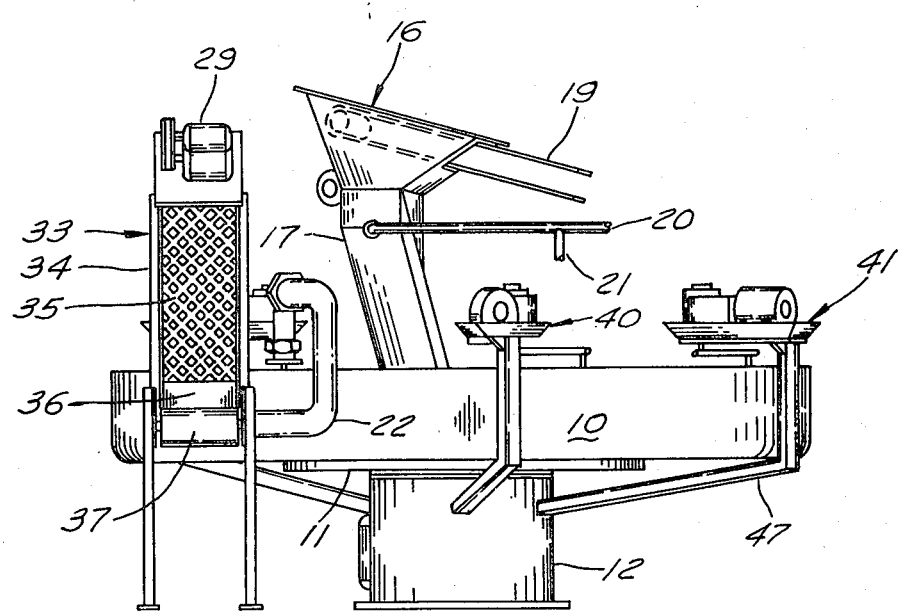
FIG. 3 is a front elevation of the apparatus shown in FIG. 1.
Figure 4:
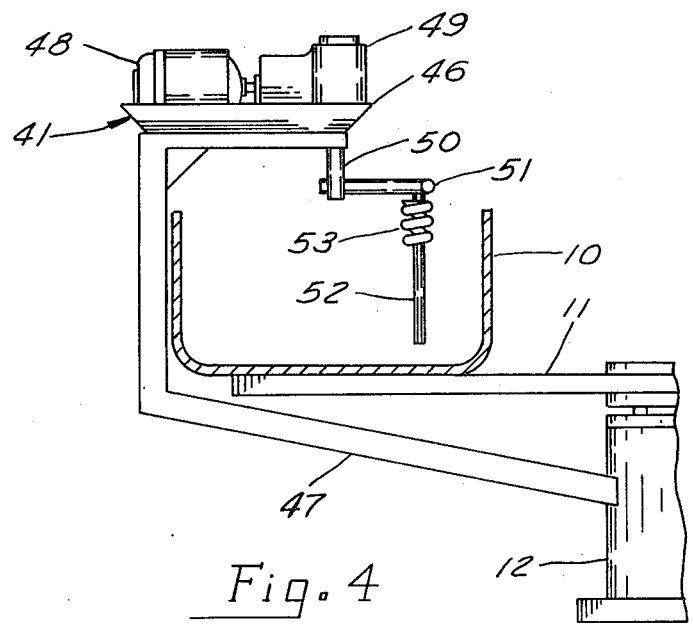
FIG. 4 is a partial detail view of a portion of the apparatus taken at line 4—4 in FIG. 1 and showing an agitating means.

The method of the present invention more precisely contemplates that continuous streams of water and curd pieces are intermixed and carried through a circular course while being agitated continuously so as to expose each piece of curd to substantially identical washing conditions of time and temperature. Preferably, a body of water is maintained in an annular zone which itself is constantly rotated about its central axis to form a continuous closed stream. At one point along the circular course, cheese curd pieces are continuously introduced at a rate somewhat dependent upon the volume of water contained in the zone. At the same location a uniform rate (also somewhat dependent upon the volume of the zone and rate of curd processing) of fresh make-up water is continuously introduced to convey the milled curd into the vessel. The fresh make-up water also regulates the water temperature maintained within the annular zone, and it has been found that the temperature is significant to the washing operation. That is, moisture pickup by the cheese curd occurs more rapidly with relatively lower water temperatures. In fact it has been found that at temperatures below about 60° F. most curd will absorb water too fast for practical control of the required final moisture content. Also knitting of the curd when subsequently hooped and pressed, after washing, is facilitated and improved where the curd is relatively warmer. Accordingly, it is preferred that the water temperature within the annular zone be maintained below 85° F. and, if possible, above 60° F. And it is usually preferred to heat the fresh make-up water, prior to mixing with the milled curd, to a temperature within that range. The precise temperature of the water must be selected by the operator in conjunction with the nature of the milk being used, the time duration range available and within control, and the characteristics required of the final cheese.

At another point slightly further upstream from the introduction of the cheese curd, the curd is continuously removed from the annular zone. Hence the curd is carried in the zone and water through a circular path constituting slightly less than one complete revolution of the annular zone. A portion of water is also discharged with the cheese curd, and the rate of discharge is preferably established to discharge more water than is supplied from the fresh source. A portion of the discharged water may be recirculated to the zone as make-up so as to maintain the level of water therein constant. Thus the rate at which discharge water is recirculated should be variable upon demand and adjusted according to the water level in the zone. Preferably the recirculated make-up water is introduced into the zone at a location slightly upstream of the introduction of the cheese curd.

During the course of movement of the curd and water with the annular zone, the curd and water are continuously agitated at a plurality of points between the infeed and discharge points. This agitation is preferably in the form of stirring throughout the depth of water so as to intimately mix and keep suspended the curd pieces therein.

Following discharge of the curd and a portion of water, which preferably is accomplished by lifting same above the zone, the curd is separated from the removed water and thence passed to normal processing operations such as the salting of the curd and packing of same within hoops whence it is stored and aged.

In one embodiment of the invention it has been found that cheese curd may be processed at a rate of 130 pounds per minute within an annular zone containing approximately 400 gallons of water. The fresh make-up water is introduced at a rate ranging from 20 gallons per minute to 30 gallons per minute to flush the curd into the zone; and the fresh water is heated by direct injection of stream so as to maintain a temperature in the zone of approximately 60°–85° F. Within those limits most curds can be washed for a period of from about 2 to about 5 minutes and obtain a moisture content of about 40–50 percent. Finished Colby cheese may have 40 percent maximum moisture; and similarly washed-curd, Monterey, and Jack cheeses may have maximum moisture of 42, 44 and 50 percent, respectively. Hence the rate of rotation of the annular zone should be adjustable so as to complete one rotation in from just over 2 to about 6 minutes. The precise time for rotation (and hence soaking) is dependent upon the spread of temperatures between curd and water and the permissible moisture content of the finished cheese. Moisture pickup is more rapid as the temperature spread is increased and hence for some higher-moisture cheeses soaking at 85° water will require a maximum time of 6 minutes, but other cheese allowing less moisture may be processed in 2 minutes with 60° F. water.

The apparatus devised to carry out the foregoing process is shown in detail in the drawings. An annular vessel 10, preferably formed from stainless steel, is mounted upon a rotatable frame such as the spider 11 shown in FIG. 1. In turn the rotatable frame is mounted upon a stationary pedestal 12 as is best seen in FIGS. 2 through 5. Within or adjacent to the stationary pedestal 12 are a motor and variable speed drive 13 which are drivingly connected to the spider 11 to rotate same. Suitable bearings, not shown, are provided between the pedestal and spider to reduce the friction of motion.

A curd-feed means generally 16 is located over the vessel 10 and comprises an inclined chute 17 extending from beneath a curd mill 18 which is, in turn, positioned beneath the terminus of an endless conveyor 19 that delivers a ribbon of curd from a cheddaring machine (not shown). The delivery chute 17 extends downwardly to a point directly over the annular vessel 10 and is aimed to prevent overthrow of the curd pieces beyond the inside wall of the vessel 10. A fresh water supply pipe 20 is connected to the upper end of chute 17 just below the curd mill 18 to direct a stream of water across the chute to flush the curd pieces therethrough. A steam line 21 is connected to the pipe 20 through a control valve (not shown).

The annular vessel 10 is driven in a counterclockwise direction as indicated by the arrow in FIG. 1. Adjacent the curd-feed means 16 and slightly upstream thereof (in a clockwise direction) is a water recirculation line 22 and a float control-type valve 23 adjusted to regulate the water level in the annular vessel 10. The recirculation line 22 extends from beneath the discharge means as will be hereinafter described.

Also located a short distance upstream (clockwise) from the curd-feed means generally 16 is a discharge means generally 26 which extends from within the annular vessel 10 and is arranged to remove the curd and a portion of the water therefrom. The discharge means generally 26 comprises an auger 27 mounted within an inclined casing 28 that extends upwardly to a point above and to one side of the vessel 10. At the uppermost point an electric motor and variable speed drive 29 are connected to power the auger 27. At the lowermost point within the vessel 10 is an intake doctor blade 30 fastened to the underside of the casing 28 and shaped to closely fit the bottom surface of the vessel 10.

In operation the water and the curd are carried bodily in a counterclockwise course by the rotating vessel 10. Upon completing nearly a full rotation, the water and curd will reach the discharge means generally 26 whereupon the intake doctor blade 30 will direct substantially all of the curd into the casing 28 where auger 27 will lift same and a portion of the water upwardly from the vessel.

Upon passing beyond the upper terminus of the auger 27 the lifted curd and water are directed across a separating means generally 33 which comprises a declining dewatering chute 34 with screen 35 and a lower deflector 36. The curd is intercepted by the screen 35 and descends there along while the water passes therethrough to the chute 34 and is discharged beneath the apparatus. A portion of the discharged water is diverted for recirculation to the vessel through pipe 22 by a pump (not shown). The curd upon reaching the bottom of the screen 35 is diverted by the deflector 36 onto the surface of an endless takeaway conveyor 37.

During the course of movement from the curd-feed means generally 16 to the discharge means generally 26, the curd and water pass a plurality of agitators generally 40, 41, 42 and 43. The agitators are located in fixed positions above the vessel 10 and do not rotate with the latter. Each of the agitators 40, 42 and 43 are constructed similar to agitator 41 which is shown in detail in FIG. 4. Each comprises a mounting bracket 46 positioned directly above the vessel 10 and supported on a cantilever arm 47 that extends outwardly from pedestal 12 beneath the spider 11 and vessel 10. On each mounting bracket 46 is an electric motor 48 and speed reducer 49. An output shaft 50 of the speed reducer is positioned vertically and downwardly toward the interior of vessel 10. The shaft 50 in turn drives a stirring member comprised of a crank 51 extending horizontally from the shaft 50 and a paddle or rod 52 depending beneath the outer end of the crank 51. Preferably the paddle 52 is attached to the crank 51 by a flexible connector such as a spring 53 so as to permit the paddle to swing and twist within the fluid in vessel 10.

Figure 5:
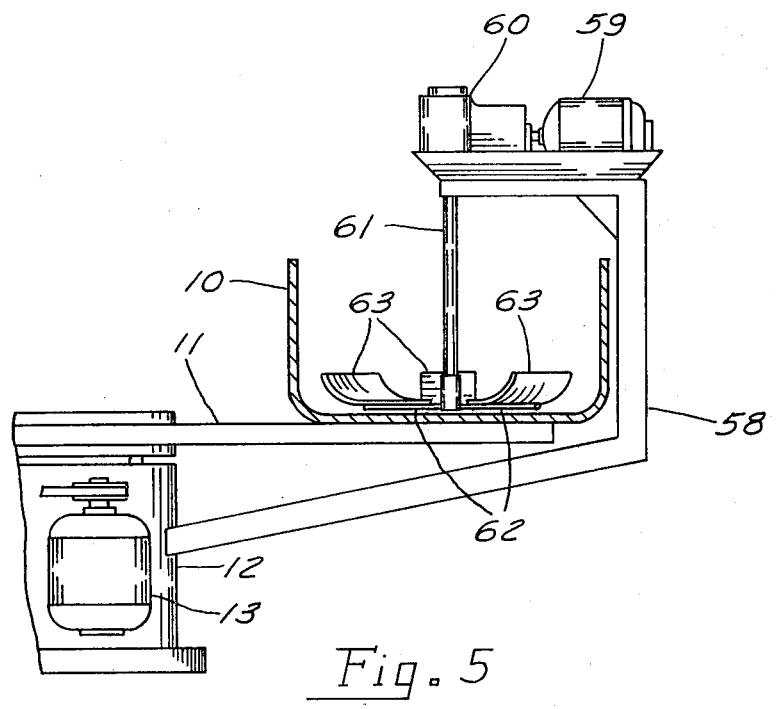
FIG. 5 is a partial detail view of another portion of the apparatus shown in FIG. 1 taken at line 5—5 therein and showing another agitating-lifting means.

It is also preferred that an agitating member be located closely adjacent the discharge means generally 26. However, this agitator is preferably of somewhat different construction to enable it to perform a second function, namely a lifting of the curd from the bottom of vessel 10 as it approaches the intake doctor blade 30. Thus as is seen in FIGS. 1 and 5 a lifting agitator generally 56 is similarly mounted on a mounting bracket 57 supported from a cantilever arm 58 at a position close to the discharge means 26. The lifting agitator comprises an electric motor 59, speed reducer 60 and output shaft 61, the latter being disposed vertically and downwardly toward the vessel 10. A plurality of radial spokes extends outwardly from shaft 61 at a level closely spaced from the bottom of vessel 10. Each spoke 62 has attached at the outer end thereof a curved metal vane 63 comprising a arcuate segment that, when shaft 61 is rotated, propels the curds upwardly from the bottom of the vessel 10.

Obviously many modifications and variations of the invention as hereinbefore set forth may be made without departing from the spirit and scope thereof, and, therefore, only such limitations should be imposed as are indicated in the appended claims.

We claim:

1. An improved method for washing cheese curd, said method comprising: maintaining a body of curd and water in an annular zone while continuously carrying said body of curd and water on a circular course; feeding curd continuously to said zone at a first point in said course; introducing water continuously to said zone; agitating the water and curd at a plurality of points along said course; and discharging continuously all of said curd with a portion of said water from said zone at a final point in said course.

2. The method of claim 1 including the step of lifting the curd from the bottom of said body of curd and water just in advance of said final point in said course.

3. The method of claim 1 including the step of separating the curd from said portion of water following the discharging of same from said zone.

4. The method of claim 1 including the step of supplying fresh make-up water to said zone continuously with said curd at said first point.

5. The method of claim 4 wherein a variable quantity of said portion of water discharged with the curd is recirculated to said zone in accordance with the level of water therein so as to maintain said level constant.

6. The method of claim 4 wherein said fresh make-up water is at a temperature between about 60° and 85° F.

7. The method of claim 1 wherein every piece of said curd is discharged from said zone within 1 to 6 minutes of being fed thereto.

8. The method of claim 1 wherein said body of water, curd and said annular zone are rotated about the center of said zone at a rate of one rotation in about 2 to 6 minutes.

9. The method of claim 6 wherein said body of water, curd and said annular zone are rotated about the center of said zone at a rate of one rotation in about 2 to 6 minutes.

10. The method of claim 9 wherein the make-up water temperature and rate of rotation of said zone are interdependently selected to result in a desired moisture content of the curd discharged therefrom.

11. An improved apparatus for washing cheese curd, said apparatus comprising: an annular vessel for maintaining a body of curd and water; means to rotate said annular vessel about its central axis; feeding means to deposit curd into said vessel at a fixed location; water supply means for introducing a quantity of water to said vessel; a plurality of agitating means for stirring said body of curd and water in said vessel, said agitating means being located at fixed positions around said vessel; and a discharging means located beyond said agitating means for removing curd and a portion of water from said vessel.

12. The apparatus of claim 11 including a lifting agitator means for raising the curd within the body of curd and water from the bottom of said vessel, said lifting agitator means being located at a fixed position beyond said agitator means and just in advance of said discharging means.

13. The apparatus of claim 11 including separating means beyond said discharging means and outside of said vessel for dividing the curd from the portion of water discharged therewith.

14. The apparatus of claim 11 wherein the means to rotate said annular vessel comprises a rotatable frame supporting said vessel and mounted upon a stationary frame and having a variable speed means connected to turn said rotatable frame.

15. The apparatus of claim 11 wherein said feeding means comprises downwardly inclined chute and said water supply means comprises a water supply pipe attached to the upper end of said chute whereby to flush the curd therethrough.

16. The apparatus of claim 15 wherein heating means is connected to heat the water delivered through said supply pipe.

17. The apparatus of claim 15 including recirculating means to return to said vessel a quantity of said portion of water discharged therefrom, and means connected to said recirculating means to regulate said quantity so as to maintain a selected water level in said vessel.

18. The apparatus of claim 14 wherein said agitator means are mounted from said stationary frame at spaced positions about said annular vessel between said feeding means and said discharging means, and each said agitator means is positioned directly above said annular vessel with a portion extending into said vessel.

19. The apparatus of claim 18 wherein each agitating means is comprised of a motor mounted above said annular vessel and a stirring member connected to said motor and extending into said vessel.

20. The apparatus of claim 19 wherein each stirring member includes a crank arm connected to the motor and a paddle flexibly connected to the crank arm and extending into said vessel.

21. The apparatus of claim 18 including a lifting agitator means mounted similar to said agitating means and positioned just in advance of said discharging means, said lifting agitator comprised of a motor mounted above said annular vessel, a rotatable shaft extending downwardly into said vessel, a plurality of radial spokes extending from said shaft, and curved lifting vanes attached to the ends of said spokes.

* * * * *